(12) United States Patent
Guo et al.

(10) Patent No.: US 12,046,265 B1
(45) Date of Patent: Jul. 23, 2024

(54) DATA STORAGE DEVICE WITH ENHANCED MANAGEMENT OF LASER PRE-BIAS AND LOGIC BLOCK ADDRESSING IN HEAT-ASSISTED MAGNETIC RECORDING

(71) Applicant: WESTERN DIGITAL TECHNOLOGIES, INC., San Jose, CA (US)

(72) Inventors: Guoxiao Guo, Irvine, CA (US); Erhard S. Schreck, San Jose, CA (US); William B. Boyle, Lake Forest, CA (US); Kei Yasuna, Fujisawa (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/232,128

(22) Filed: Aug. 9, 2023

Related U.S. Application Data

(60) Provisional application No. 63/523,724, filed on Jun. 28, 2023, provisional application No. 63/435,721, filed on Dec. 28, 2022.

(51) Int. Cl.
*G11B 5/02* (2006.01)
*G11B 5/54* (2006.01)
(Continued)

(52) U.S. Cl.
CPC ...... *G11B 5/596* (2013.01); *G11B 2005/0021* (2013.01)

(58) Field of Classification Search
CPC ........... G11B 5/48; G11B 5/56; G11B 33/144; G11B 5/09; G11B 5/455; G11B 5/012;
(Continued)

(56) References Cited

U.S. PATENT DOCUMENTS 8,787,125 B1  7/2014  Lee
9,019,646 B2  4/2015  Rausch et al.
(Continued)

OTHER PUBLICATIONS

Xiong et al., "Compensation for the Write Start Transient in Heat-Assisted Magnetic Recording," https://ieeexplore.ieee.org/document/8017415, Aug. 29, 2017, 4 pages.
(Continued)

*Primary Examiner* — Nabil Z Hindi
(74) *Attorney, Agent, or Firm* — Calderon Safran & Wright, PC

(57) ABSTRACT

Various illustrative aspects are directed to a data storage device, comprising one or more disks; an actuator mechanism configured to position one or more heads proximate to a corresponding disk surface of the one or more disks; and one or more processing devices. The one or more processing devices are configured to: select a sector on the corresponding disk surface to which to write data, wherein the sector is selected in accordance with a data erosion mitigation pattern; and output, while the head is positioned proximate to a preceding sector that precedes the selected sector, a laser pre-bias current to a laser-generating component of the head, wherein the laser pre-bias current is sufficient to induce significant data erosion on the preceding sector.

20 Claims, 8 Drawing Sheets

(51) Int. Cl.
*G11B 5/596* (2006.01)
*G11B 5/00* (2006.01)

(58) Field of Classification Search
CPC ....... G11B 5/5582; G11B 5/82; G11B 7/1263; G11B 7/00456; G11B 7/1267; G11B 7/00458; G11B 13/08; G11B 2005/0021; G11B 11/1051; G11B 11/105; G11B 5/00; G11B 5/6088; G11B 11/10511; G11B 27/36; G11B 20/18
USPC ........................................................ 360/59
See application file for complete search history.

(56) References Cited

U.S. PATENT DOCUMENTS

| | | |
|---|---|---|
| 9,202,506 B1 | 12/2015 | Mader et al. |
| 9,620,162 B1 | 4/2017 | Haralson |
| 9,842,619 B1 | 12/2017 | Chu et al. |
| 9,916,851 B1 | 3/2018 | Seigler et al. |
| 10,657,987 B1 | 5/2020 | Chu et al. |
| 11,694,712 B2 * | 7/2023 | Poss ......................... G11B 5/02 360/69 |

OTHER PUBLICATIONS

Xiong et al., "Spacing Control in Heat-Assisted Magnetic Recording," https://ieeexplore.ieee.org/abstract/document/8467381, Sep. 18, 2018, 6 pages.

Xiong et al., "Spacing Dependency of Near Field Recording and Its Application," https://www.researchgate.net/publication/328949611_Spacing_Dependency_of_Near_Field_Recording_and_its_Application, Aug. 2018, 4 pages.

Ma et al., "Writing Process Modeling and Identification for Heat-Assisted Magnetic Recording," https://ieeexplore.ieee.org/abstract/document/7575670, Sep. 23, 2016, 8 pages.

Office Action dated Mar. 26, 2024 in related U.S. Appl. No. 18/232,145, 7 pages.

* cited by examiner

DATA STORAGE DEVICE WITH ENHANCED MANAGEMENT OF LASER PRE-BIAS AND LOGIC BLOCK ADDRESSING IN HEAT-ASSISTED MAGNETIC RECORDING

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine actuators, in some examples.

SUMMARY

Various examples disclosed herein provide data storage devices such as hard disk drives with control circuitry that includes novel and inventive circuitry for managing laser pre-bias in a heat-assisted magnetic recording (HAMR) disk drive to enable enhanced data storage performance, in accordance with aspects of the present disclosure. In conventional HAMR disk drives, operating the lasers in the read/write heads involves complex effects on the fly height, or head-disk spacing, between the write element pole tips of the heads and the disk surfaces. Thermal energy from operating the laser induces protrusion and modification of a read/write head and evolving changes in the fly height over the course of a write operation, particularly during the initial interval of a write operation. These thermal effects on head protrusion and fly height have typically interfered with or prevented nominal write strength and reliable writes, particularly during the initial stage of an attempted write operation. Recent advances in HAMR technologies have included applying an early partial pre-bias current to a laser diode incorporated in a HAMR read/write head, prior to activating the laser at nominal current for write operations, but laser pre-bias has introduced its own new complications in HAMR write operations. Another recent compensation technique for unreliable initial write strength has been to wait until thermal energy and thermally driven head protrusion have stabilized before writing, but this adds latency and results in wasted disk capacity for unpredictably affected sectors.

Disk drives of this disclosure introduce novel, inventive techniques for intelligently and comprehensively managing both laser pre-bias and logic block addressing, thereby resolving various shortcomings of conventional HAMR disk drives and enabling novel advantages in data storage performance characteristics, such as data density and reliability and disk drive longevity in HAMR disk drives, in various aspects as further described below. A disk drive of this disclosure may include novel and inventive laser pre-bias and logic block addressing management circuitry and firmware. Such pre-bias management circuitry achieves more powerful write strength from the beginning of HAMR write operations, by abandoning the conventional avoidance of applying high enough levels of laser pre-bias current to damage existing data in preceding sectors, and instead applying boosted levels of laser pre-bias current, higher than have been used before. Laser pre-bias management circuitry of this disclosure avoids damaging existing data by combining higher than previously allowable laser pre-bias current with novel and inventive means of systematically managing both logic block addressing and boosted laser pre-bias current levels in write operations for selecting sectors in accordance with a data erosion mitigation pattern, for both avoidance of proximity to pre-existing data during boosted laser pre-bias, and alleviation of erosion to pre-existing data induced by boosted laser pre-bias. These and other novel and inventive aspects of this disclosure are further described below.

Various illustrative aspects are directed to a data storage device, comprising one or more disks; an actuator mechanism configured to position a selected head among one or more heads proximate to a corresponding disk surface among the one or more disks; and one or more processing devices. The one or more processing devices are configured to: select a sector on the corresponding disk surface to which to write data, wherein the sector is selected in accordance with a data erosion mitigation pattern; and output, while the head is positioned proximate to a preceding sector that precedes the selected sector, a laser pre-bias current to a laser-generating component of the head, wherein the laser pre-bias current is sufficient to induce significant data erosion on the preceding sector.

Various illustrative aspects are directed to a method comprising selecting, by one or more processing devices, a sector on a corresponding disk surface of a data storage device to which to write data, wherein the sector is selected in accordance with a data erosion mitigation pattern. The method further comprises outputting, by the one or more processing devices, while the head is positioned proximate to a preceding sector that precedes the selected sector, a laser pre-bias current to a laser-generating component of the head, wherein the laser pre-bias current is sufficient to induce significant data erosion on the preceding sector.

Various illustrative aspects are directed to one or more processing devices comprising means for outputting, at a time when a head of a data storage device is positioned proximate to a preceding sector that precedes a selected sector to which to write data on a corresponding disk surface, a laser pre-bias current to a laser-generating component of the head, such that the laser pre-bias current is sufficient to induce data erosion on the preceding sector, but not enough data erosion on the preceding sector to erase data written on the preceding sector in a single pass of the head proximate to the preceding sector. The one or more processing devices further comprise means for incrementing, in an index, a tracking measure referenced to the preceding sector.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

DETAILED DESCRIPTION

Figure 1:
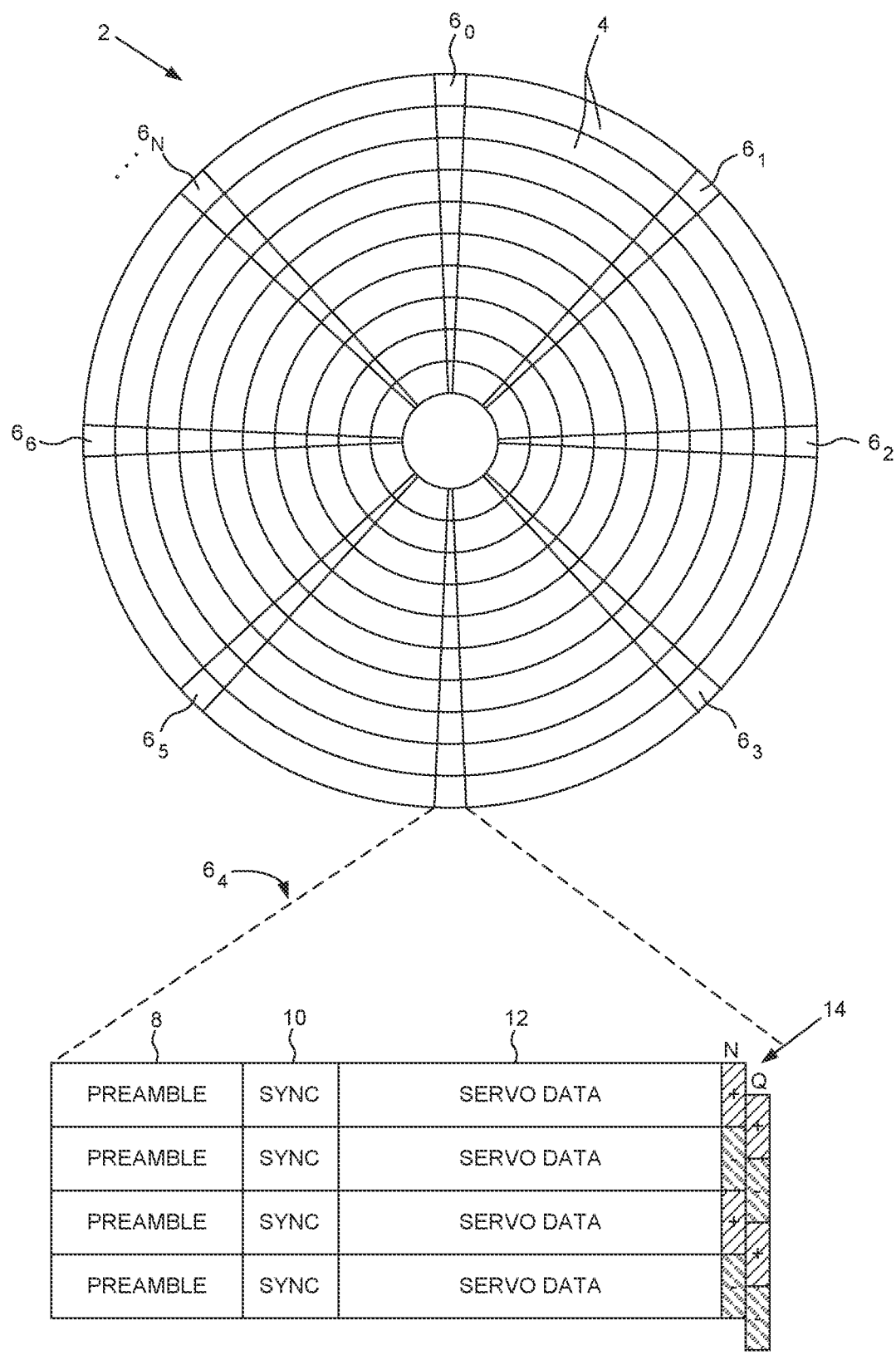
FIG. 1 shows a prior art disk format as comprising a number of radially-spaced, concentric servo tracks defined by servo wedges recorded around the circumference of each servo track.
Figure 2:
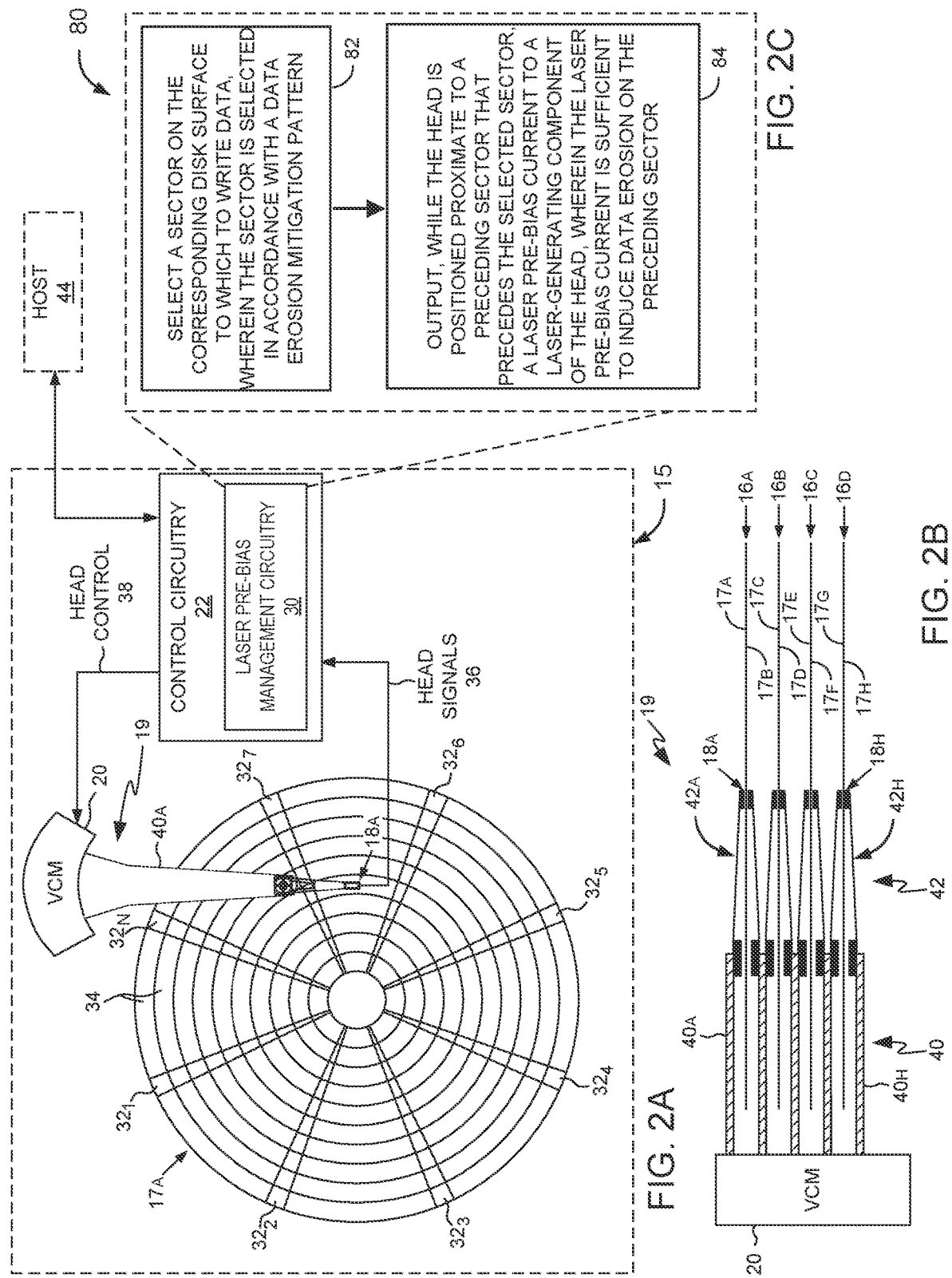
FIGS. 2A and 2B illustrate conceptual block diagrams of a top view and a side view of a data storage device in the form of a disk drive, in accordance with aspects of the present disclosure.
FIG. 2C depicts a flowchart for an example method that read/write channel circuitry of control circuitry of a disk drive may perform or execute in controlling the operations of the disk drive, including for managing laser pre-bias and logic block addressing to enhance or optimize reliable starts to HAMR write operations while avoiding and/or alleviating laser pre-bias-induced data erosion, in accordance with aspects of the present disclosure.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). Control circuitry 22 comprises laser pre-bias management circuitry 30, which is configured to avoid, alleviate, and otherwise manage thermal decay or erosion of data on disk surfaces induced by laser pre-bias by a HAMR head operating at boosted levels capable of strong initial write strength, for purposes of enabling greater data storage performance characteristics, in accordance with aspects of the present disclosure. FIG. 2C depicts a flowchart for an example method 80 that laser pre-bias management circuitry 30 of control circuitry 22 may perform or execute in controlling the operations of disk drive 15, in accordance with aspects of the present disclosure, including operations involved in managing laser pre-bias and logic block addressing to enhance or optimize reliable starts to HAMR write operations while avoiding and/or alleviating laser pre-bias-induced thermal decay or erosion of data to enable greater data storage performance, in accordance with aspects of the present disclosure.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples. Each suspension assembly 42 suspends a slider at a distal end thereof, with one of read/write heads 18 ("heads 18") mounted on the slider.

Each of actuator arms 40 is thus configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one primary actuator 20 in the example of FIGS. 2A and 2B, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks, or ten or eleven or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a greatly simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges 321-32N, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges 321-32N and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads 18 radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples. An actuator mechanism such as actuator arm assembly 19 may thus be configured to position heads 18, including a selected head among one or more heads 18, proximate to a corresponding disk surface 17 among the one or more disks 16.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In particular, laser pre-bias management circuitry 30 of control circuitry 22 may select a sector on the corresponding disk surface to which to write data, wherein the sector is selected in accordance with a data erosion mitigation pattern (82). Laser pre-bias management circuitry 30 may further output, while the head is positioned proximate to a preceding sector that precedes the selected sector, a laser pre-bias current to a laser-generating component of the head, wherein the laser pre-bias current is sufficient to induce significant thermal data erosion on the preceding sector (84). Control circuitry 22, and laser pre-bias management circuitry 30 in particular, may further perform additional actions, methods, and techniques, in accordance with various aspects including as further described herein.

The term "laser pre-bias management circuitry 30" as used herein may refer to any hardware, firmware, software, and/or combination thereof, comprised in control circuitry 22 of disk drive 15, which implements, embodies, or engages in any of the structures or functions ascribed herein to laser pre-bias management circuitry 30 or to any other of the novel and inventive aspects of the present disclosure. Laser pre-bias management circuitry 30 may constitute any hardware, firmware, software, and/or any other elements of control circuitry 22 for controlling laser pre-bias, controlling and tracking logic block addressing (LBAs), avoiding and alleviating data erosion due to laser pre-bias, performing compensatory refresh writes as part of alleviating data erosion due to laser pre-bias, and performing other techniques and methods as described herein.

Figure 3:
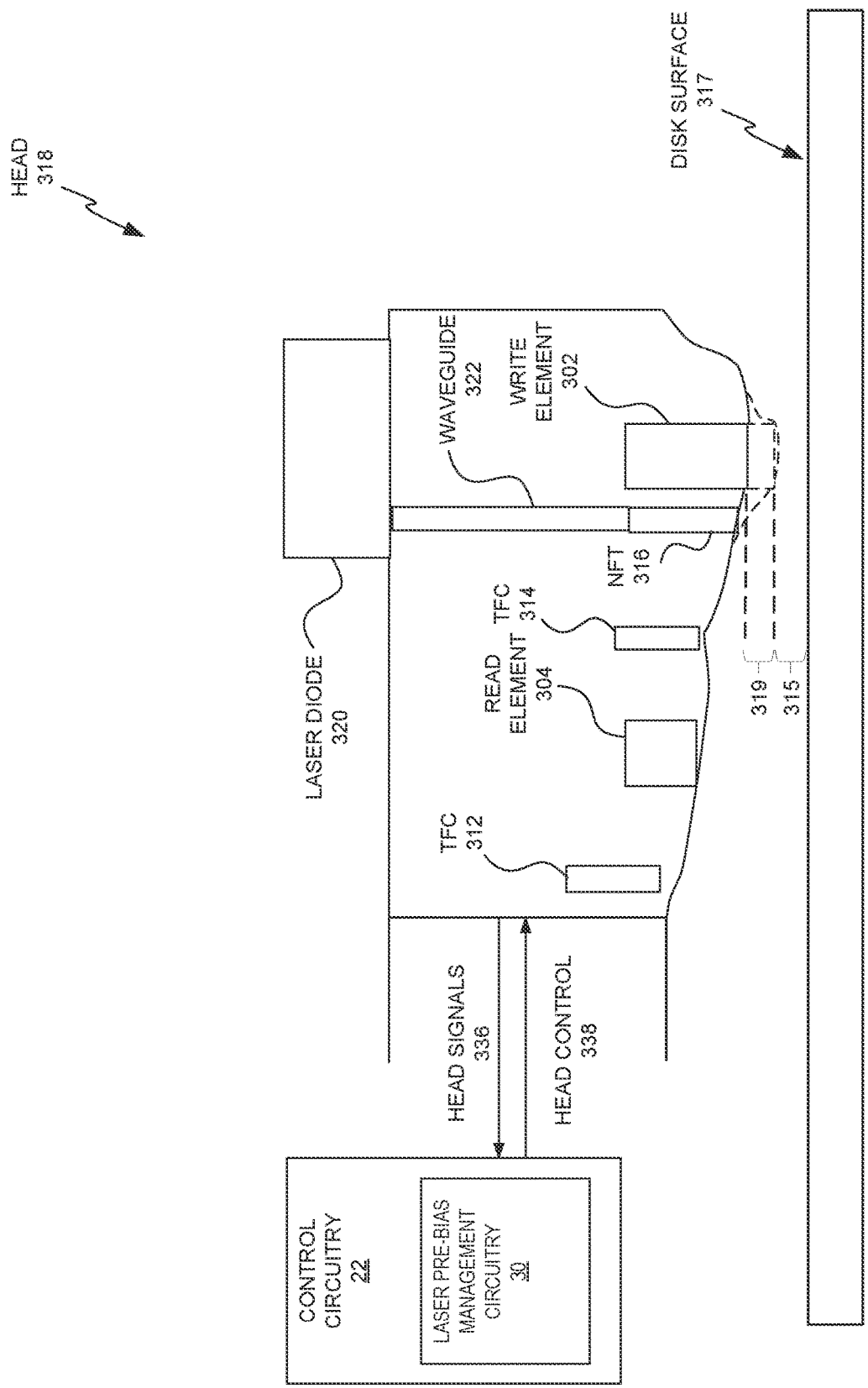
FIG. 3 depicts a conceptual side view diagram of a head of a disk drive, suspended above and operating proximate to a corresponding disk surface, and demonstrating changes in protrusion and aerodynamic profile causing changes in fly height, or head-disk spacing, due to effects such as near-field transducer (NFT) pole tip protrusion (NPTP), in accordance with various aspects of this disclosure.

FIG. 3 depicts a conceptual side view diagram of a head 318 of a disk drive, suspended above and operating proximate to a corresponding disk surface 317, and demonstrating changes 319 in protrusion and aerodynamic profile causing changes in fly height 315, or head-disk spacing, due to effects such as near-field transducer (NFT) pole tip protrusion (NPTP), in accordance with various aspects of this disclosure. Head 318 and corresponding disk surface 317 may be an example of one of heads 18 and corresponding disk surfaces 17 as shown in FIGS. 2A and 2B. FIG. 3 is a conceptual diagram and not an engineering schematic, and the elements depicted may be disposed in any of a variety of arrangements in different examples.

Control circuitry 22 outputs head control signals 338 to head 318, and receives head signals 336 (including control signals and data) from head 318. Head 318 includes a write element 302, a read element 304, thermal fly height (TFC) control elements 312 and 314, and a laser-generating component such as a laser diode 320 configured for emitting a laser via waveguide 322 and near-field transducer (NFT) 316. The laser induces a plasmon that heats a track on disk surface 317 that passes proximate to write element 302 as head 318 flies over disk surface 317.

Control circuitry 22 writes data to disk surface 317 by modulating a write current in an inductive write coil in write element 302, to record magnetic transitions onto corresponding disk surface 317 in a process referred to as saturation recording. During read-back, read element 304 (e.g., a magneto-resistive element) in head 318 senses the magnetic transitions, and a read channel demodulates the resulting read signal. Heat-assisted magnetic recording (HAMR) enables high-quality written data at high densities enabled by a high-coercivity medium, by heating the disk surface 317 during write operations in order to decrease the coercivity of the magnetic medium, thereby enabling the magnetic field generated by the write coil to magnetize the temporarily heated area of disk surface 317. The disk surface encoding the data thus written then cools back down and thereby returns to heightened magnetic coercivity, which preserves the durability of the written data at higher density than is possible in conventional techniques such as perpendicular magnetic recording (PMR).

Any suitable technique may be employed to heat the surface of the disk in HAMR recording, such as with a laser-generating component such as laser diode 320 and NFT 316 disposed proximate to write element 302 of head 318. Since the quality of the write/read signal depends on the fly height of head 318, and various factors may interact in complex ways to induce changes to the fly height, head 318 may also comprise one or more fly height actuators (FHA) for modifying or controlling the fly height. Any type of fly height actuator may be employed, such as TFCs 312, 314 as in the example of FIG. 3, which control or influence fly height of head 318 above disk surface 317 through thermal expansion, or a piezoelectric (PZT) actuator (not included in the example of FIG. 3) that actuates through mechanical deflection, or other FHA embodiments, in other examples.

Laser pre-bias management circuitry 30 of control circuitry 22 may control the operation of head 318 to avoid and/or alleviate high laser pre-bias in the context of changes in fly height 315 due to effects such as NPTP, to enable greater data storage performance, in accordance with aspects of this disclosure. The effective fly height 315 may be considered as the head-disk spacing between the pole tip of write element 302 and the corresponding disk surface 317, regardless of the center of mass of head 318, since the head-disk spacing determines the strength of a write operation using write element 302 of head 318 to the proximate area of disk surface 317.

Some conventional HAMR drives operate with a low level of pre-bias current applied to a laser, prior to a write operation. In these examples, the drives limit the laser pre-bias to a safety margin well below a level that would begin to induce any significant or non-trivial heating of the proximate disk surface and erosion of any pre-existing data in user data sectors that head 318 flies proximate to at its cruising fly height or non-write fly height, while pre-biasing the laser diode. ("User data sectors" between servo wedges in a track may also be referred to simply as "sectors" herein.) As an example, conventional laser pre-bias over the data sector is typically at a low enough level that a head with a pre-biasing laser diode could pass proximate to the sector 1,000 times without inducing enough thermal erosion on the data sector to substantially impact the readability of its data, let alone to erase its data, in typical examples. Thus, in such conventional examples, the laser pre-bias current is not sufficient to induce data erosion on the preceding sector, at least not to any meaningful or significant degree, but rather is negligible at most and can be disregarded. Such traditional safety margin limits are higher than a laser threshold at which the diode begins to emit a laser, thereby inducing a plasmon onto the disk surface would heat the disk surface but not raising the recording media temperature to a point that erodes the data or servo pattern.

In contrast, laser pre-bias management circuitry 30 incorporates the concept of a write approach flight in which it abandons that traditional safety margin in laser pre-bias current, and instead applies a boosted laser pre-bias current high enough to provide a stronger initial write strength starting from the beginning of a write operation, while relying on a combination of logic block addressing and varying levels of laser pre-bias to both avoid and alleviate thermal erosion of pre-existing data or servo pattern, in various examples. In particular, laser pre-bias management circuitry 30 may select sectors in accordance with and operate in a data erosion avoidance mode of a data erosion mitigation pattern, in which it controls the logic block addressing to enhance or maximize its opportunities to write data to blocks of sectors subsequent to preceding sectors that are empty of pre-existing data. For purposes of this disclosure, laser pre-bias management circuitry 30 selecting sectors subsequent to sectors that are empty of pre-existing data in accordance with a data erosion mitigation pattern may include selecting sectors subsequent to sectors either that are still new and have never yet had data written to them, or that contain old data that has been deleted at the level of the operating system or of host 44, such that the preceding sector is also deemed empty of pre-existing data and freely available to expose to heat that would erode or destroy pre-existing data.

Laser pre-bias management circuitry 30 may also select sectors in accordance with and operate in a data erosion alleviation mode of a data erosion mitigation pattern, in which it again controls the logic block addressing to select one or more sectors to write to, and applies a boosted laser pre-bias current to laser diode 320 while controlling head 318 to make an approaching flight proximate to one or more preceding sectors that precede the initial write sector and that contain pre-existing data. The approaching flight of the head with the boosted laser pre-bias decreases the coercivity of the magnetic medium of disk surface 317 of the one or more preceding sectors, and potentially erodes the signal strength of pre-existing data written there, but laser pre-bias management circuitry 30 applies a combination of techniques to alleviate erosion of pre-existing data and to prevent loss of pre-existing data, even while providing enhanced write strength from the start of the new write operation to the selected one or more sectors subsequent to the one or more preceding sectors, as further described below.

Laser pre-bias management circuitry 30 in aspects of this disclosure may thus be configured to select one or more sectors on disk surface 317 to which to write data in accordance with a data erosion mitigation pattern, and output, while the head is positioned proximate to one or more preceding sectors that precede the selected one or more sectors to which to write data, a boosted laser pre-bias current to laser diode 320, wherein the boosted laser pre-bias current is sufficient to induce significant thermal data erosion on the one or more preceding sectors that precede the selected one or more sectors to which to write data. Laser pre-bias management circuitry 30 applies laser pre-bias current sufficient to initiate the new write operation reliably, yet also while avoiding erasing data in the one or more preceding sectors, through both avoidance and alleviation of laser pre-bias-induced thermal data erosion on the one or more preceding sectors, in various examples. Laser pre-bias management circuitry 30 in aspects of this disclosure may thus implement laser pre-bias currents that are boosted above conventional levels, to levels that may generally be distinguished over conventional values in that they are outside of traditional safety margins that traditionally limit the pre-biasing head from being capable of inducing substantial data erosion or even destruction of pre-existing data, except that laser pre-bias management circuitry 30 instead implements novel techniques and methods of avoidance and/or alleviation of any such data erosion. Avoidance and alleviation of laser pre-bias-induced thermal data erosion are further explained below, in accordance with various examples.

Laser pre-bias management circuitry 30 thus implements novel and inventive techniques such as optimizing laser pre-bias to achieve nominal write strength from the start of a write operation, which may generally include implementing higher laser pre-bias than in conventional HAMR, while performing either or both of systematically avoiding, and systematically alleviating, thermal decay of disk surface media and pre-existing data induced by such enhanced laser pre-bias. These techniques include both novel and inventive techniques for managing the values of laser pre-bias, and novel and inventive techniques for managing the logic block addressing for write operations.

Laser pre-bias management circuitry 30 may begin operating disk drive 15, at the beginning of lifetime operation of disk drive 15 as a fresh new drive with no existing data stored thereon, completely in a laser pre-bias-induced thermal decay avoidance mode. Over time, as the disk drive fills up with data, laser pre-bias management circuitry 30 may generally gradually transition from a laser pre-bias-induced thermal decay avoidance mode to a laser pre-bias-induced thermal decay alleviation mode. Examples of such an avoidance mode and an alleviation mode in which laser pre-bias management circuitry 30 may manage laser pre-bias-induced thermal decay, and the transition between them, are further described as follows. Aspects of systematic avoidance and systematic alleviation of laser pre-bias-induced thermal effects, and other aspects of this disclosure, are further shown in the subsequent figures and described as follows in connection therewith.

A certain increment of laser current may have a regular, predictable, linear, or approximately linear in a small operating range, correspondence with a certain increment of power, a certain incremental change in NPTP displacement, and a certain incremental change in fly height spacing (within a practically applicable range), in various examples. For instance, in various illustrative examples of this disclosure, the laser threshold current, the nominal write laser current for performing write operations, and various boosted laser pre-bias current levels may be measured in tens of milliamps, or single-digit milliamps. Applicable fly height spacing may be measured in different values in single-digit or fractional nanometers (i.e. hundreds of picometers), in various examples. Applicable TFC power may be measured in different values in single-digit milliwatts, in various examples. Applicable levels of laser current, fly height, and TFC power may also be in ranges greater or less than these values in other examples.

Figure 4A:
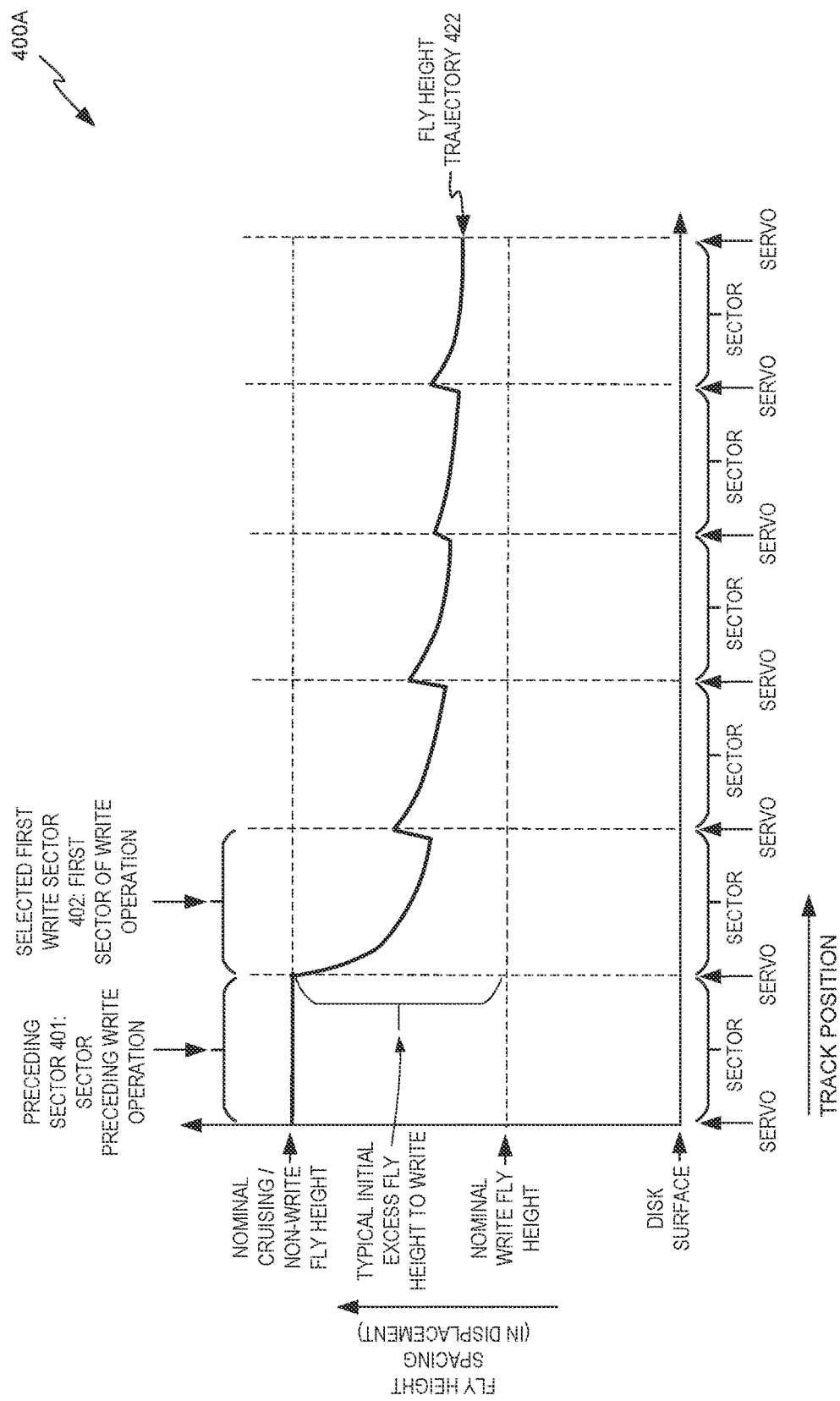
FIG. 4A depicts a graph illustrating a conventional prior art fly height trajectory, as a basis of comparison, of fly height or head-disk spacing over time between a write element of a head and a corresponding disk surface, including the effects of NPTP, in a sector preceding a write operation, and in subsequent sectors during a write operation over several sectors.

FIG. 4A depicts a graph 400A illustrating a conventional prior art fly height trajectory 422, as a basis of comparison, of fly height or head-disk spacing over time between a write element of a head and a corresponding disk surface, including the effects of NPTP, in a sector preceding a write operation, and in subsequent sectors during a write operation over several sectors. The fly height approaches a nominal write fly height over time, as the laser operates at nominal write laser current during write operations and thereby gradually approaches a steady state in temperature, and thus correspondingly gradually approaches a steady state in NPTP and its accompanying morphological and aerodynamic modifications of the head. However, the fly height approaches the nominal fly height in an asymptotic descent from initially being far above the nominal fly height prior to the write operation, prior to the head approaching and stabilizing at its steady state in write operating temperature due to the laser operating at nominal write current, and prior to the accompanying changes in NPTP and the shape and aerodynamics of the head. This is particularly pronounced in the designated first write sector 402 of the write operation, when the head begins from its pre-write value of fly height, which it maintains during its nominal cruising/non-write fly height, through preceding sector 401 as the final sector that precedes the write operation.

FIG. 4A and fly height trajectory 422 also show a more moderated but repeating pattern of a jump in fly height at each servo interval between sectors and then another, milder asymptotic descent in fly height over the course of each subsequent sector of the write operation, where the control circuitry deactivates the laser diode and the write element to prevent cross-talk or read interference and servo pattern erasure as the head passes over the servo wedges between sectors to read the servo information to maintain fine control of navigation.

Among the inventive discoveries and insights of this disclosure is that these off-nominal fly height effects as depicted in FIG. 4A, most particularly in the first write sector 402 of a write operation, have typically interfered with nominal write operations, due to the head being at so much higher than nominal write fly height, as well as at highly varying fly heights, especially throughout the first write sector 402, such that the data write strength is substantially attenuated, especially throughout the first write sector 402. This has typically resulted in data being written far below nominal write strength, if at all written with any recoverable signal-to-noise ratio (SNR), in the early part of a HAMR write operation, especially in the first sector 402 of a write operation, such that the write to the first sector 402 or part of sector 402 has not been reliable or usable.

Laser pre-bias management circuitry 30 successfully resolves these issues, in various aspects of this disclosure. Laser pre-bias management circuitry 30 successfully enables reliable HAMR write operations beginning with the first sector, among other inventive advantages in accordance with aspects of this disclosure.

Figure 4B:
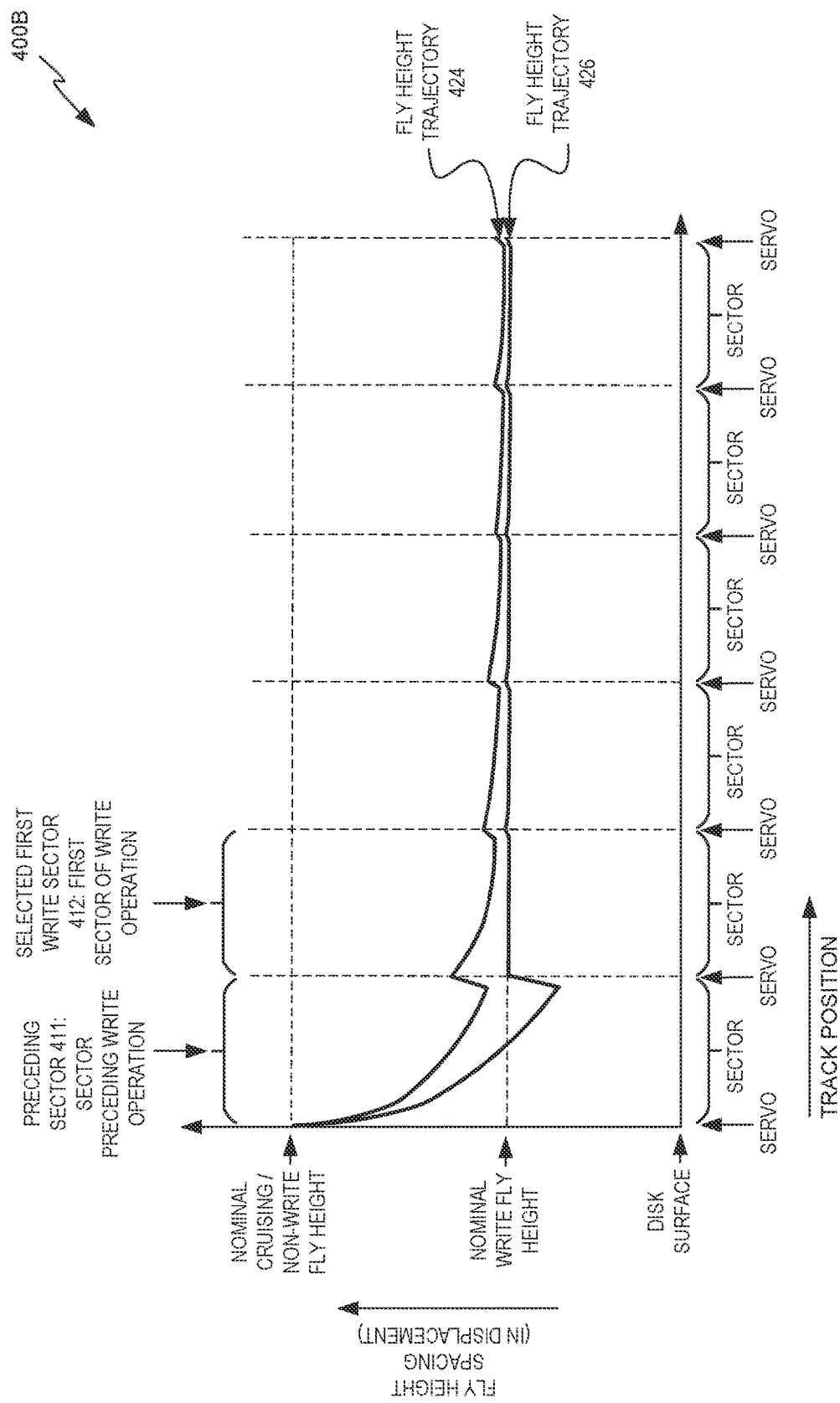
FIG. 4B depicts a conceptual graph illustrating two example novel fly height trajectories of fly height or head-disk spacing over time between a write element of a head and corresponding disk surface, including the effects of NPTP, in a preceding sector that precedes a write operation, and in subsequent sectors beginning with a selected first write sector to which to write data during a write operation over several sectors, in accordance with aspects of this disclosure.

FIG. 4B depicts a conceptual graph 400B illustrating two example novel fly height trajectories 424 and 426 of fly height or head-disk spacing over time between a write element of a head 318 and corresponding disk surface 317 as shown in FIG. 3, including the effects of NPTP, in a preceding sector 411 that precedes a write operation, and in subsequent sectors beginning with a selected first write sector 412 to which to write data during a write operation over several sectors, in accordance with aspects of this disclosure. Fly height trajectories 424 and 426 both illustrate examples of laser pre-bias management circuitry 30 operating in data erosion avoidance mode, and selecting the block of sectors beginning with sector 312 to which to write, based at least in part on sector 411 being unused and empty of pre-existing data. That is, laser pre-bias management circuitry 30 may select the sector 412 to which to write data, where selecting sector 412 to which to write data includes selecting a sector subsequent to a sector 411 that does not comprise pre-existing data, in this example of data erosion avoidance mode.

This lack of pre-existing data in sector 411 gives laser pre-bias management circuitry 30 leeway to apply very high laser pre-bias current to laser diode 320 while head 318 is in flight over preceding sector 411, including at levels at and above levels that would erode or destroy any pre-existing data if any did exist in preceding sector 411. In particular, in the example of fly height trajectory 424, laser pre-bias management circuitry 30 applies a laser pre-bias current equal to the full nominal write laser current used during a write operation; and in the example of fly height trajectory 426, laser pre-bias management circuitry 30 applies a laser pre-bias current moderately higher than the full nominal write laser current used during a write operation.

In fly height trajectory 424, with laser pre-bias management circuitry 30 applying a boosted laser pre-bias current that is equal or substantially equivalent to the nominal write laser current during flight proximate to the preceding sector 411, head 318 exhibits a fly height that approaches much of the way toward the nominal write fly height during the head's passage proximate to preceding sector 411, rebounds back upward moderately during the head's passage across the servo wedge immediately prior to the write operation, and then head 318 begins the write operation at the beginning of the selected first write sector 412 at close to the nominal write fly height, and dramatically closer to nominal write fly height than in the prior art example depicted in FIG. 4A. Accordingly, head 318 is already ready to perform nominal, reliable writing of data to first write sector 412 from the beginning of the write operation to first write sector 412.

Under ongoing control by laser pre-bias management circuitry 30, head 318 continues asymptotically approaching nominal write fly height over the course of the write operation, with minor rebounds as laser pre-bias management circuitry 30 continues briefly lowering the laser pre-bias during passage of the head over each servo wedge between sectors, and head 318 continues performing a nominal write operation. Relative to the example of FIG. 4A, fly height trajectory 424 shows a much more moderated repeating pattern of a jump in fly height at each servo interval between sectors and then another, milder asymptotic descent in fly height over the course of each subsequent sector of the write operation, where control circuitry 22 deactivates laser diode 320 and write element 302 to prevent cross-talk or read interference as head 318 passes over the servo wedges between sectors to read the servo information to maintain fine control of navigation. In other examples, the boosted laser pre-bias current may be a substantial fraction of the nominal write laser current, such as at least half of the nominal write laser current, or at or above a laser threshold of the laser diode or other laser-generating component.

In fly height trajectory 426, with laser pre-bias management circuitry 30 applying a laser pre-bias current moderately higher than the nominal write laser current during flight proximate to the preceding sector 411, head 318 exhibits a fly height that slightly overshoots the nominal write fly height during the head's passage proximate to preceding sector 411, then rebounds just enough during the head's passage across the servo wedge immediately prior to the write operation to arrive right at the theoretically ideal nominal write fly height, just as head 318 begins the write operation at the beginning of the selected first write sector 412. This overshoot in temperature of the head thus enables the head to cool just enough while flying over the final pre-write servo wedge to arrive at the ideal temperature as the head finishes flying over the servo wedge and begins flying over the first sector 411 to write, and as laser pre-bias management circuitry 30 resumes applying current to the laser diode to reactivate the laser, now at the nominal laser write current, as control circuitry 22 initiates the write operation.

In this way, laser pre-bias management circuitry 30 may achieve practically a theoretically ideal steady state in temperature and fly height of the head from the beginning of the write operation, and a practically theoretically ideal elimination of attenuating effects on write strength from startup of the write operation. Accordingly, head 318 is already at the theoretically ideal nominal write fly height and ready to perform nominal, reliable writing of data to first write sector 412 from the beginning of the write operation to first write sector 412. Head 318 in fly height trajectory 426 undergoes only a slight loss in thermal energy and NPTP and increase in fly height during crossing of each servo wedge, barely perceptible on the scale of FIG. 4B, as laser pre-bias management circuitry 30 temporarily reduces laser pre-bias to servo-safe levels on each servo crossing, though thermal lag from thermal steady state at the ideal temperature immediately beforehand means that the deviation from ideal is barely if at all significant, in this example. Maintaining the laser pre-bias at the thermal steady state level over a write-to-read recovery (WRR) area (further described below), while the write element is off and before NFT 316 passes proximate to the servo wedge, further alleviates the slight deviation from ideal. Under ongoing control by laser pre-bias management circuitry 30, head 318 continues operating in practically thermal steady state, and practically steady state in NPTP and its accompanying morphological and aerodynamic modifications of head 318, at the nominal write fly height over the course of the write operation, without non-negligible deviations from nominal write fly height as head 318 continues performing a nominal write operation, in this example.

While fly height trajectory 426 illustrates a case where the first wedge write has no spacing transient, in still other examples, laser pre-bias management circuitry 30 may apply a laser pre-bias in between those of the examples of fly height trajectories 424 and 426, at other values of laser pre-bias that are also higher than NWLC but not as high as for fly height trajectory 426, such that the first wedge write has the same very small initial fly height transient as the subsequent wedge writes. In these cases, the writing and decoding of the first sector can be made even more consistent with the writing and decoding for the subsequent sectors, and there is no need for any differences to account for the nominal spacing variations from sector to sector. In still other examples, laser pre-bias management circuitry 30 may apply the laser pre-bias to increase slightly as the head approaches the end of each sector and approaches or passes over each WRR area (further described below), to again pre-compensate either fully or partially for the very small loss of thermal energy and NPTP and very small gain in fly height during crossing proximate to each servo wedge, as in the case approaching the start of first write sector 412 in fly height trajectory 426.

Figure 5:
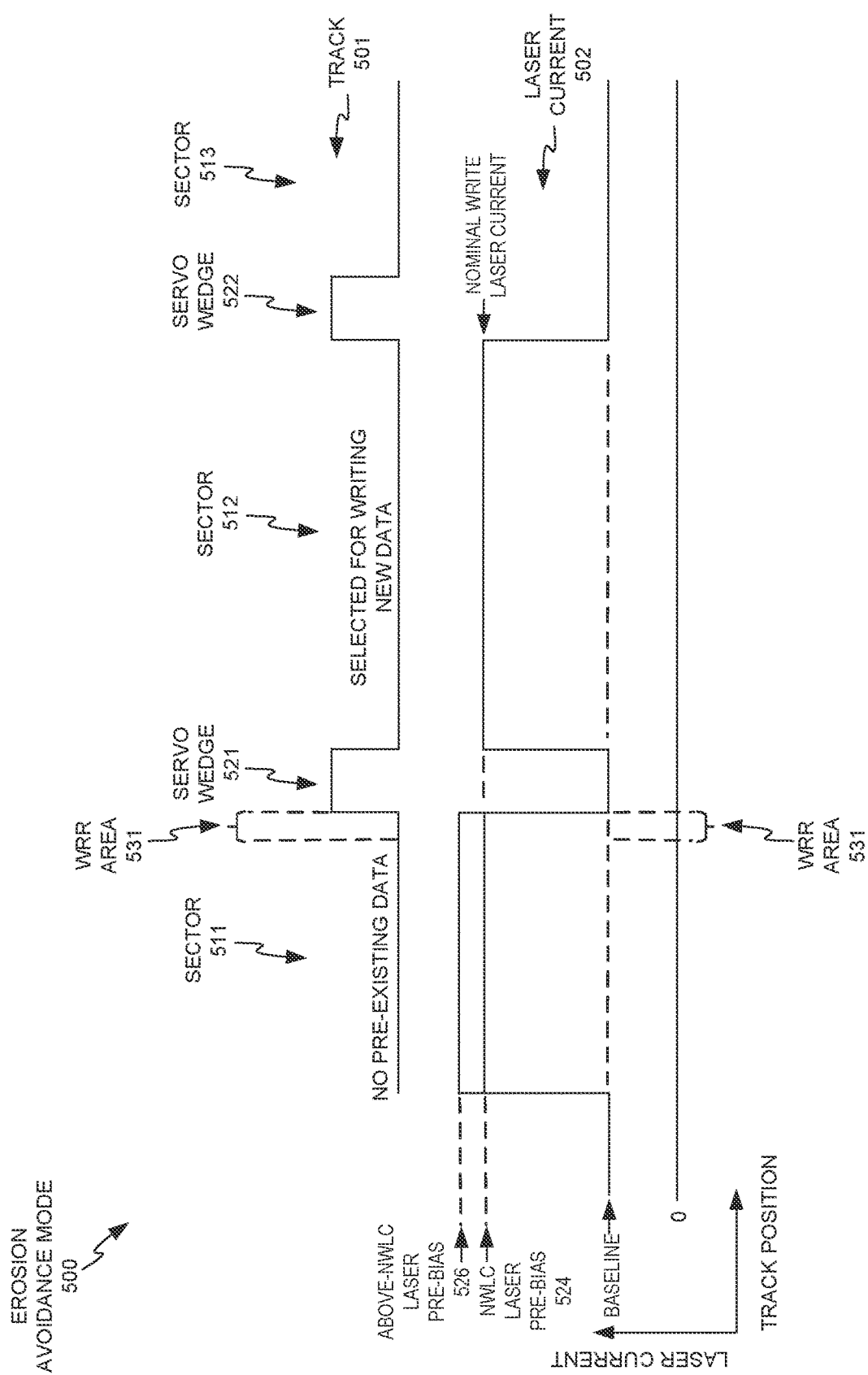
FIG. 5 depicts a conceptual graph of a laser current that laser pre-bias management circuitry may apply to a head in a laser pre-bias-induced thermal decay avoidance mode, as the head flies over a corresponding track, including two example laser pre-bias current levels, in accordance with aspects of this disclosure.

FIG. 5 depicts a conceptual graph 500 of a laser current 502 that laser pre-bias management circuitry 30 may apply to head 318 in a laser pre-bias-induced thermal decay avoidance mode, as head 318 flies over corresponding track 501, including two example laser pre-bias current levels 524, 526, in accordance with aspects of this disclosure. These two examples include applying a laser pre-bias current 524 that is equal to the nominal write laser current applied during write operations, and applying a laser pre-bias current 526 that is moderately higher than the nominal write laser current applied during write operations, respectively corresponding to the examples described with reference to fly height trajectories 424, 426 of FIG. 4B.

The present techniques of a systematic avoidance mode of thermal decay include novel and inventive techniques of laser pre-bias management circuitry 30 performing and tracking logic block addressing to select logic block addresses (LBAs) for performing new writes in algorithms that systematically write in tracks that contain no prior data, or perform writes prior to pre-existing data in a track, including such that a new write is finished just prior to the start of pre-existing data, and to avoid writing to LBAs that would have pre-existing data in one or more sectors prior to the new write. In other words, laser pre-bias management circuitry 30 may prioritize writing new data to new tracks with no pre-existing data in the track, or to sectors with pre-existing data earlier within a track relative to sectors in the track that contain pre-existing data.

Graph 500 shows a conceptual depiction of a portion of a track portion 501 containing sectors and servo wedges between the sectors, and a corresponding laser current graph 502 of laser current over time at the corresponding positions along track portion 501, in an example of the present disclosure. Track portion 501 includes sequentially contiguous sectors 511, 512, and 513, separated by servo wedges 521, 522, respectively.

Graph 500 is shown in terms of laser current 502 along the y-axis as it corresponds with track position along the x-axis. The x-axis may also practically equivalently be stated in terms of time, since control circuitry 22 operates the disk drive with a highly regular angular speed and nominal servo-to-servo time interval (e.g., measured in a set number of microseconds in some examples).

In this example, control circuitry 22 has a single sector's worth of data to write. Laser pre-bias management circuitry 30 initially identifies sequentially contiguous sectors 511 and 512 as empty or blank sectors, without pre-existing data written thereto, and selects sector 512 as the sector in which to perform the write operation, at least in part because it is preceded by empty sector 511, such that laser pre-bias management circuitry 30 has complete freedom to impose laser pre-bias of any value, not limited by any need to protect preceding sector data (and only within limits as described below) while the head is proximate to sector 511 in the interval of its approach and descent (e.g., the descent of its write element pole tip) to sector 512. Here the single sector 512 to write is for illustrative purposes only. The same concept also applies to multiple sector writes as depicted in FIG. 4B.

FIG. 5 illustratively shows laser pre-bias management circuitry 30 outputting a laser pre-bias current to the laser diode of the head while the head is passing proximate to sector 511 at either the same current as the nominal write laser current, in the example of laser pre-bias 524, which is the same value of laser bias current that control circuitry 22 also outputs to the laser diode of the head while the head passes proximate to sector 512 and performs a write operation to write data to sector 512; or at above-nominal write laser current laser pre-bias 526, respectively, in the two examples depicted. In other examples, laser pre-bias management circuitry 30 may output a laser pre-bias current to the laser diode of the head while the head is passing proximate to sector 511 at other currents below or above the nominal write bias current, above conventional pre-bias current values, and above values that would degrade or destroy data in sector 511 if there were any data in sector 511.

Laser pre-bias management circuitry 30 may thus implement boosted laser pre-bias with a pre-bias laser current that is above-nominal write laser current (above-NWLC), in various examples. Using an above-nominal write laser current may close the fly height spacing gap to even closer than nominal write fly height, ahead of the brief loss of fly height while lowering the laser current while the head passes over the servo wedge, but such that that brief loss of fly height while lowering the laser current while the head passes over the servo wedge substantially or precisely places the head at the nominal fly height at the start of the sector to be written, in various examples. Using an above-nominal write laser current may thus thereby pre-emptively substantially or completely compensate for and eliminate changes in fly height during startup of a write operation, and approach or achieve the theoretical ideal nominal fly height from the first moment of the write operation, in various examples.

In some examples, raising the boosted laser pre-bias current to above the nominal write laser current may be performed in balance with one or more recognized constraints, such as: ensuring fly height does not become too far reduced below nominal during the boosted laser pre-bias; avoiding or limiting interference with or erosion of data on adjacent tracks due to the boosted laser pre-bias current; and preventing or limiting any lifetime reliability effects on the laser diode from operating at hotter energies and temperatures than those of the nominal write laser current. In different examples, any or all or none of these effects may be significantly applicable, and laser pre-bias management circuitry 30 may be configured to account for any or all or none of them in determining, optimizing, and calibrating an optimum boosted laser pre-bias current at which to operate.

Laser pre-bias management circuitry 30 may also be configured to determine whether one or more of these effects should be taken into account as part of a calibration process for each head of the disk drive, to use any one or more of these factors in calibrating an all-factors-optimized boosted pre-bias laser current, and then to operate in accordance with that determined calibrated all-factors-optimized boosted pre-bias laser current, in various examples. Laser pre-bias management circuitry 30 may perform an initial calibration for each of one or more of the heads of the disk drive as part of a manufacturing process in the factory, and/or may perform later calibration or re-calibration of one or more of the heads in-field as part of its ongoing operations, in various examples.

In accordance with various examples of this disclosure, laser pre-bias management circuitry 30 may also detect and track LBAs to select one or more sectors to which to write such that the one or more sectors to which to write are either in a completely empty or blank track, or immediately preceding pre-existing data. In the example of FIG. 5 and of writing a single sector, laser pre-bias management circuitry 30 also uses this criterion and selects sector 512 based also in part either on all of the sectors in the track being empty, or sector 513 having pre-existing data written thereto. Thus, laser pre-bias management circuitry 30 selecting the sector 512 to which to write data may include selecting one or more sectors immediately preceding a sector 513 that comprises pre-existing data, in this example. In this way, laser pre-bias management circuitry 30 may pack data together to continually maximize the number of remaining sectors that have preceding empty sectors with no pre-existing data, rather than allowing data to be written in LBA patterns that are scattered apart and only sub-optimally preserve available track space with preceding empty sectors, in various examples.

FIG. 5 also shows that laser pre-bias management circuitry 30 may maintain the laser pre-bias current during a short segment 531 between a data area of sector 511 and servo wedge 521 between sectors 511 and 512, in some examples. This short segment is a write-to-read recovery (WRR) area 531, which immediately precedes servo wedge 521. The WRR area 531 is from where the control circuitry 22 shuts off the write signal with enough margin to prevent cross-talk interference between write and read for performing a read operation of servo wedge 521, to when the NFT reaches the servo pattern, where too high an NFT pre-bias would damage the servo pattern. Whereas conventional HAMR drives deactivate current to the laser in tandem with deactivating the write element, laser pre-bias management circuitry 30 may maintain the laser pre-bias current independently of operating the write element, and at a boosted level, while the NFT is passing over the WRR, even while no write current is applied to the write element. In this way, laser pre-bias management circuitry 30 may thereby achieve a longer boosted pre-bias current interval and closer to nominal write fly height before flying over servo wedge 521 and then writing to sector 512, and reduce the servo crossing gap time in boosted laser pre-bias, and ensure substantially less reduction in NPTP, before beginning the write operation to sector 512. Laser pre-bias management circuitry 30 may thus be configured to maintain the laser pre-bias current while the NFT is passing over the WRR area 531 preceding the servo wedge 521.

In some examples, laser pre-bias management circuitry 30 may maintain the laser pre-bias current while the NFT of the head is passing proximate to the WRR area 531 preceding the servo wedge 521. In some other examples, laser pre-bias management circuitry 30 may apply a separate, independent laser pre-bias current while the NFT of the head is passing proximate to the WRR area 531. That is, laser pre-bias management circuitry 30 may separately categorize a preceding sector-proximate laser pre-bias current for applying during the preceding sector, and a servo-proximate laser pre-bias current, at a servo-safe value lower than the preceding sector-proximate laser pre-bias current, at a level safe for exposing the servo wedge to, to apply while NFT of the head is passing proximate to a servo wedge; and may also separately, independently categorize and apply a WRR area-proximate laser pre-bias current while the NFT is passing proximate to a WRR area preceding a servo wedge, wherein the WRR area-proximate laser pre-bias current is independent of both the preceding sector-proximate laser pre-bias current, and the servo-proximate laser pre-bias current. This may, for example, enable laser pre-bias management circuitry 30 to briefly apply a WRR area-proximate laser pre-bias current that is even higher than the preceding sector-proximate laser pre-bias current, to briefly pre-compensate for thermal cooling, loss of NPTP displacement, and gain in fly height while the NFT of the head is passing proximate to the servo wedge (at some displacement along the length of the head from the read element which reads the servo code of the servo wedge). By so doing, laser pre-bias management circuitry 30 may enhance or optimize where the values end up for the NPTP and fly height after passage proximate to the servo wedge and at the beginning of writing to the subsequent, selected sector, thereby further contributing to the strength and consistency of the write signal from the start of the write to the selected sector. This may occur for the start of writing a single sector or first sector, or for any sector in a write of two or more contiguous sectors. In other words, referring to FIG. 4B, by applying such a WRR area-proximate laser pre-bias current, laser pre-bias management circuitry 30 may even further smooth out the very minor variations in fly height and write strength around the servo wedges relative to fly height trajectory 426.

Laser pre-bias-induced decay avoidance techniques such as these may thereby enhance or maximize the number of write operations that laser pre-bias management circuitry 30 may perform with no pre-existing data in one or more sectors immediately preceding the one or more sectors to which the new data is to be written. This enables laser pre-bias management circuitry 30 with freedom to pre-bias laser diode 320 at higher than conventional nominal values of laser pre-bias current, including values approaching or at nominal values of laser write bias current, or higher than nominal values of laser write bias current, proximate to empty sectors where there is no pre-existing data to be decayed or destroyed by the proximity of head 320 in a state of high thermal energy due to the pre-biasing laser diode. By techniques such as these, laser pre-bias management circuitry 30 enables the head to approach or even achieve steady state in temperature, in NPTP, in shape and aerodynamic properties, and in fly height early in or prior to initiating the write operation to sector 512, thereby promoting or ensuring nominal write quality and reliable write to sector 512, in various examples.

Figure 6:
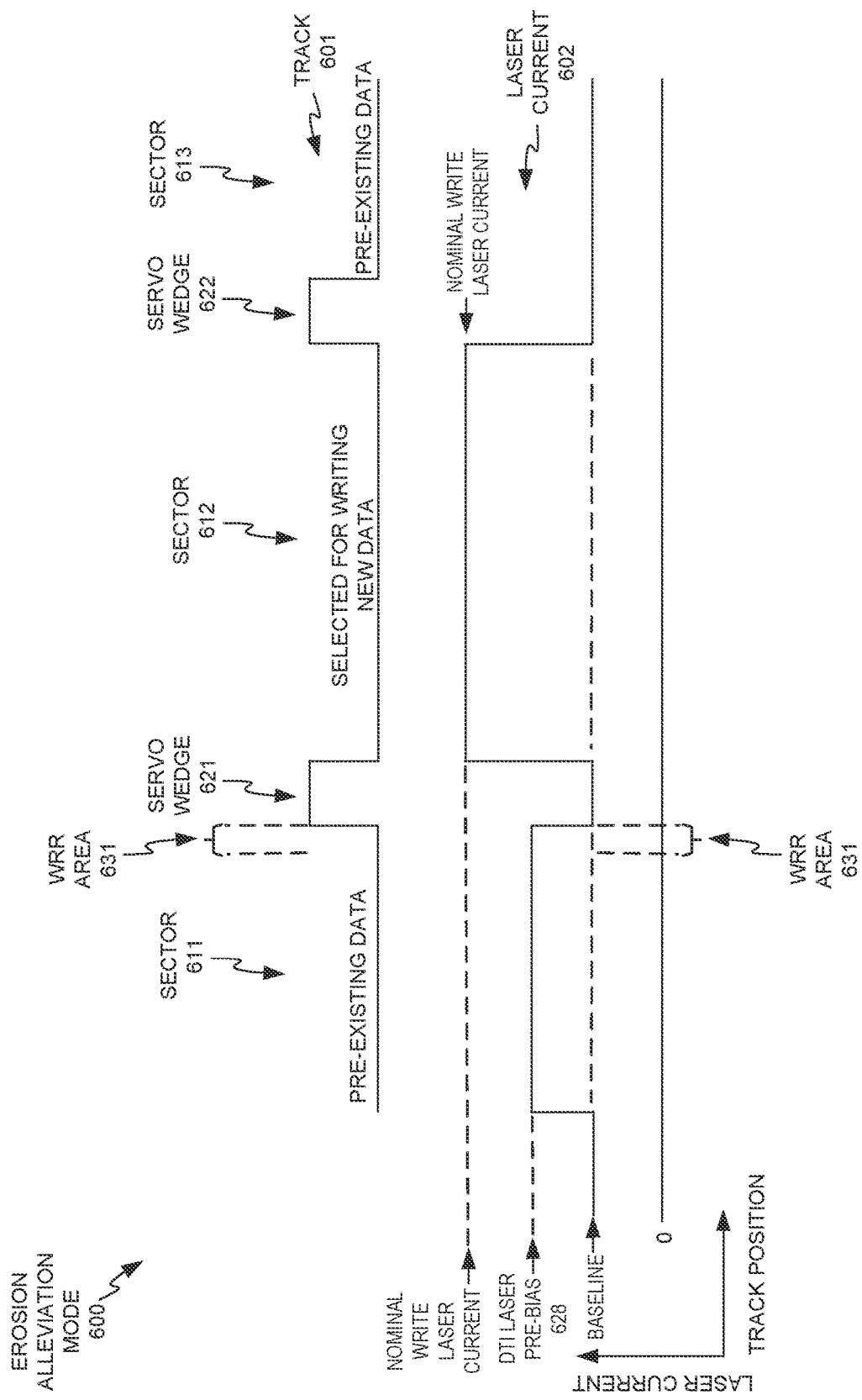
FIG. 6 depicts a conceptual graph of laser pre-bias management circuitry implementing a laser pre-bias-induced thermal decay alleviation mode, with a pre-write laser pre-bias proximate to a preceding sector that does contain pre-existing data, in accordance with aspects of this disclosure.

FIG. 6 depicts a conceptual graph 600 of laser pre-bias management circuitry 30 implementing a laser pre-bias-induced thermal decay alleviation mode, with a pre-write laser pre-bias proximate to a preceding sector that does contain pre-existing data, in accordance with aspects of this disclosure. The present techniques of a systematic alleviation mode of thermal decay include novel and inventive techniques of laser pre-bias management circuitry 30 applying a laser pre-bias current less than it would proximate to an empty sector and not strong enough to destroy pre-existing data, but still strong enough to erode the read signal strength of data in impacted sectors over repeated proximate flights. The present techniques of a systematic alleviation mode of thermal decay further include novel and inventive techniques of laser pre-bias management circuitry 30 accounting for and keeping track of a novel concept hereby introduced of "down-track interference" ("DTI"), of systematically controlled and tracked marginal in-track thermal decay due to above-previously-nominal laser pre-biasing, and performing background refresh writes in accordance with a DTI accounting and tracking system of this disclosure. (DTI is thus categorically distinct from the separate concept of adjacent track interference (ATI) due to magnetic effects from the write element to laterally adjacent tracks during normal write operations.)

If the disk drive fills up with data over time, there come to be fewer and potentially approaching zero sequences of sectors that remain free of pre-existing data (or of pre-existing data not designated by the operating system or host as deleted and free to be overwritten), such that the freedom of laser pre-bias management circuitry 30 to perform avoidance techniques for avoiding laser pre-bias-induced thermal decay become constrained and curtailed. Laser pre-bias management circuitry 30 may track the occurrence of the disk drive approaching capacity, and may respond to detecting the disk drive approaching capacity by beginning to transition from data erosion avoidance mode to data erosion alleviation mode. This may not be a simple binary transition, but may be dependent on the sizes of new blocks of data to write. Depending on the type of disk drive, there may begin to be not enough empty contiguous sequences of physical or logical sectors remaining to perform very large new write operations at first, and then as operations continue, the sizes of remaining available contiguous sets of sectors may become smaller over time, such that laser pre-bias management circuitry 30 may still operate in data erosion avoidance mode for small new writes while operating in data erosion alleviation mode for large new writes, for example.

Laser pre-bias management circuitry 30 may respond by transitioning from avoidance techniques to alleviation techniques, for managing and alleviating thermal decay induced by heightened laser pre-bias on pre-existing data. In this context of intelligently managed thermal effects from laser pre-bias, these thermal effects may be thought of not in terms of thermal "decay" or implied degradation and destruction of data, but rather in terms of down-track interference or DTI, which laser pre-bias management circuitry 30 is enabled to track, manage, and refresh, thereby still continuing to maintain integrity of the data indefinitely.

Graph 600 shows a conceptual depiction of a portion of a track portion 601 containing sectors and servo wedges between the sectors, and a corresponding laser current graph 602 of laser current over time at the corresponding positions along track portion 601, in an example of the present disclosure. Track portion 601 includes sequentially contiguous sectors 611, 612, and 613, separated by servo wedges 621, 622, respectively.

In this example also, control circuitry 22 has a single sector's worth of data to write. However, in this example, almost all of the disk surface space of the disk drive may already be written with data, such that laser pre-bias management circuitry 30 is unable to locate two empty sectors in a sequential row, such that a single empty sector also has a preceding empty sector, and such that laser pre-bias management circuitry 30 must write the new data to a sector whose preceding sector is written with pre-existing data. Laser pre-bias management circuitry 30 identifies sector 612 as an empty sector with no pre-existing data, while sectors 611 and 613 are written with pre-existing data. Laser pre-bias management circuitry 30 selects or designates sector 612 as the sector in which to perform the write operation and to which to write the new data.

In this case, laser pre-bias management circuitry 30 no longer has complete freedom to impose laser pre-bias of any value while the head is in flight proximate to sector 611 in the interval of its approach to sector 612. In contrast, if laser pre-bias management circuitry 30 were to pre-bias the laser diode of the head at or above full nominal write current, as in the examples of FIG. 5, it would likely destroy all of the data written on sector 611.

Instead, in this example, FIG. 6 illustratively shows laser pre-bias management circuitry 30 outputting a laser pre-bias current 628, which may be referred to as DTI laser pre-bias current 628, to the laser diode of the head while the head is passing proximate to sector 611, such that DTI laser pre-bias current 628 is at a value of current below the nominal write current, but above an old or conventional nominal laser pre-bias current with a margin of safety to prevent erosion of proximate data. Instead, DTI laser pre-bias current 628 is at a high enough level to induce non-negligible thermal erosion or down-track interference (DTI) on pre-existing data written to sector 611, while laser pre-bias management circuitry 30 intelligently manages and compensates for this DTI data erosion, to prevent loss of data and to prevent higher read latency times. This DTI pre-bias current may be a value of current that would have been destructive of data and unacceptable in conventional disk drives without the laser pre-bias management systems and techniques of the present disclosure, but which laser pre-bias management circuitry 30 may implement in ways that preserve the data written to sector 611, potentially indefinitely, while also enabling reliable writing to sector 612, even though it is a first sector of a HAMR write operation. In particular, laser pre-bias management circuitry 30 may implement alleviation techniques that may include tracking pre-bias DTI erosion per LBA and per sector, load-balancing pre-bias DTI erosion per LBA and per sector, limiting the amount of pre-bias DTI erosion per LBA and per sector without a DTI refresh write, detecting when to perform a DTI refresh write, and performing DTI refresh writes of LBAs and/or sectors once they have passed a refresh qualifying threshold level of DTI erosion.

Laser pre-bias management circuitry 30 may also detect, track, limit, refresh from, and/or otherwise manage combined erosion per LBA and/or per sector, due to DTI erosion as well as other erosive effects such as ATI erosion, in some examples. Laser pre-bias management circuitry 30 may be configured to implement DTI laser pre-bias 628 at a level of current that intelligently optimizes between initial write strength of the beginning of new data to be written, e.g., to sector 612, and alleviation of data erosion to the preceding sector impacted by DTI laser pre-bias 628, e.g., sector 611. Laser pre-bias management circuitry 30 may further be configured to calibrate this optimization between initial write strength of the beginning of new data to be written and alleviation of data erosion to the preceding sector impacted by DTI laser pre-bias 628, and to perform such calibration on an individual head-by-head basis, in various examples. Laser pre-bias management circuitry 30 may further be configured to perform initial calibration of this optimization between initial write strength of the beginning of new data to be written and alleviation of data erosion to the preceding sector impacted by DTI laser pre-bias 628 as part of the initial manufacturing process at the factory, and then to re-calibrate this optimization at one or more times in the field, in various examples.

Laser pre-bias management circuitry 30 may thus be configured to calibrate one or more parameters, such as the laser pre-bias current per time at various points in time on approach to the beginning of a write operation, for the boosted laser pre-bias current for the head, in various examples. Laser pre-bias management circuitry 30 may be configured such that calibrating includes performing a test write operation to a test sector at two or more candidate values of the boosted laser pre-bias current, and detecting a level of thermal data erosion on a preceding sector preceding the test sector at each of the two or more candidate values of the boosted laser pre-bias current, in various examples.

FIG. 6 also shows that laser pre-bias management circuitry 30 may maintain the laser pre-bias current during the WRR area between a data area of sector 611 and servo wedge 621 between sectors 611 and 612, in some examples. In this case, laser pre-bias management circuitry 30 may gain the same advantages of maintaining heightened laser pre-bias while the head passes over the WRR area as discussed above with reference to FIG. 5.

Thus, in various examples of data erosion alleviation mode, laser pre-bias management circuitry 30 selecting the sector to which to write data may include determining whether there is an available sector or other contiguous set of one or more sectors of a size for a new write operation, and that is subsequent to a preceding sector that does not comprise pre-existing data (e.g., the preceding sector is free of valid pre-existing data; the preceding sector has no data or no non-deleted data). Laser pre-bias management circuitry 30 selecting the sector to which to write data may further include detecting that there is no available sector or other contiguous set of one or more sectors of a size for a new write operation subsequent to a sector that does not comprise pre-existing data, and, in response to detecting that there is no available sector subsequent to a sector that does not comprise pre-existing data, selecting a sector subsequent to a preceding sector that comprises pre-existing data. Laser pre-bias management circuitry 30 may further be configured such that, if there is no available sector subsequent to a sector that does not comprise pre-existing data, laser pre-bias management circuitry 30 may output, at a time when the head is positioned proximate to a preceding sector that precedes the selected sector, a boosted laser pre-bias current to the laser diode of the head, at a selected laser pre-bias current level. The selected laser pre-bias current level may be high enough to be sufficient to induce data erosion on the preceding sector, but still such that the boosted laser pre-bias current is not sufficient to induce enough thermal data erosion on the preceding sector to erase data written on the preceding sector in a single pass proximate to the preceding sector. Rather, the selected laser pre-bias current level is at most at a level that induces a manageable level of data erosion on the preceding sector, which laser pre-bias management circuitry 30 is able to manage and compensate for, using techniques such as DTI increment indexing and tracking, DTI load balancing, and DTI refresh writes, and as otherwise described herein.

Further in that regard, laser pre-bias management circuitry 30 may further be configured to increment, in a down-track interference (DTI) index, a tracking number or other tracking measure referenced to the preceding sector, which provides a count of a number of times the preceding sector has been impacted by a proximate boosted laser pre-bias current. Laser pre-bias management circuitry 30 selecting the sector to which to write data may then include selecting an available sector which has a preceding sector that is at a lowest existing count of number of times the preceding sector has been impacted by a proximate boosted laser pre-bias current, or at least below a highest existing count of a number of times the preceding sector has been impacted by a proximate boosted laser pre-bias current, in various examples. In other words, laser pre-bias management circuitry 30 selecting the sector to which to write data may include DTI load-balancing, by selecting an available sector for which a preceding sector has a tracking number or other tracking measure referenced to it in the DTI index that is less than at least one other tracking number or other tracking measure in the DTI index. The tracking measure may be an integer or any number in various examples.

Laser pre-bias management circuitry 30 may be configured to detect that the DTI tracking number or other tracking measure for a given sector has reached a selected DTI refresh write threshold value, indicating that the sector has been impacted by a proximate boosted laser pre-bias current a number of times equal to a DTI write refresh threshold. Laser pre-bias management circuitry 30 may be configured to then, in response to the DTI tracking number or other tracking measure reaching a selected threshold value, perform a new refresh write of the preceding sector, reading its data and writing the data back again, including performing a repeated or intensive read if necessary, and thereby refresh the read signal strength of the DTI-impacted sector to the full, nominal read signal strength of a brand new write.

Laser pre-bias management circuitry 30 may write the data back in the same place, and may increment the DTI index counter of the preceding sector, in some examples; or may combine the data with data from other isolated sectors to form a larger number of sectors to be contiguously written, thereby reducing the number of preceding sectors with incremental data erosion and with corresponding DTI index increments, in different examples. That is, laser pre-bias management circuitry 30 may, in response to detecting a plurality of data sectors that are fragmented among sectors without data or with deleted data, rewrite the fragmented data sectors into one or more compacted sets of contiguous sectors. By rewriting the many fragmented data sectors into one larger, compacted, contiguous set or sequence of data sectors in the same track, laser pre-bias management circuitry 30 thereby frees up all of the previously many subsequent empty sectors that had been preceded by those fragmented sectors, in exchange for one longer contiguous sequence of sectors that only has one final sector that precedes one subsequent sector. So, the disk surface is no longer set up to expose many fragmented sectors to future data erosion from writing to their subsequent sectors, and laser pre-bias management circuitry 30 thereby reduces the future data erosion, and reduces the future need for data erosion tracking and refresh rewriting, for the same amount of future data storage. Instead, as earlier in the lifetime of the disk drive, laser pre-bias management circuitry 30 may then, at times, determine that there is an available sector or other contiguous set of one or more sectors of a size for a new write operation that is subsequent to a sector that does not comprise pre-existing data. Pre-bias management circuitry 30 may then output, at a time when the head is positioned proximate to a preceding sector that precedes a selected sector or contiguous set of one or more sectors to which to write data, in response to determining that there is an available contiguous set of one or more sectors of a size for the new write operation that is subsequent to the sector that does not comprise pre-existing data, a laser pre-bias current to the laser diode or other laser-generating component of the head, such that the laser pre-bias current is at a level intended and/or optimized for preparing to perform the write operation to the selected one or more sectors, for example, and without regard to its sufficiency for inducing data erosion if there were proximate data in the preceding sector. Such a level of laser pre-bias current may be at least half of a nominal write laser current, in some examples.

These pre-bias-induced data erosion alleviation techniques may thereby enhance or maximize the number of write operations that may be performed reliably while protecting pre-existing data in one or more sectors immediately preceding the one or more sectors to which the new data is to be written. This enables laser pre-bias management circuitry 30 with freedom to pre-bias laser diode 320 at higher than conventional nominal values and safety margins of laser pre-bias current, proximate to sectors that contain pre-existing data, while still preventing such data from being decayed or destroyed by the proximity of head 320 in a state of high thermal energy due to the pre-biasing laser diode. By techniques such as these, laser pre-bias management circuitry 30 enables the head to approach or even achieve steady state in temperature, in NPTP, in shape and aerodynamic properties, and in fly height, early in or prior to initiating the write operation to sector 612. Laser pre-bias management circuitry 30 may thereby promote or ensure nominal write quality and reliable write to sector 612, in various examples.

Figure 7A:
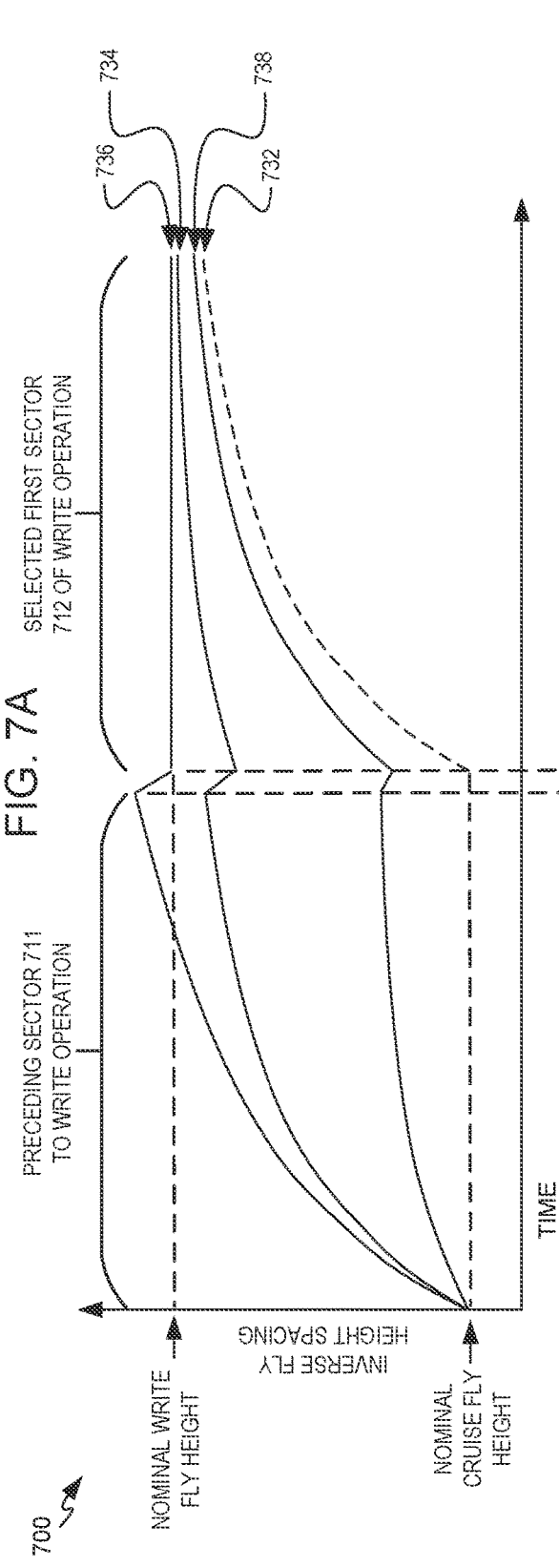
FIGS. 7A and 7B show conceptual graphs of examples of both data erosion avoidance mode and data erosion alleviation mode, in accordance with aspects of this disclosure.
Figure 7B:
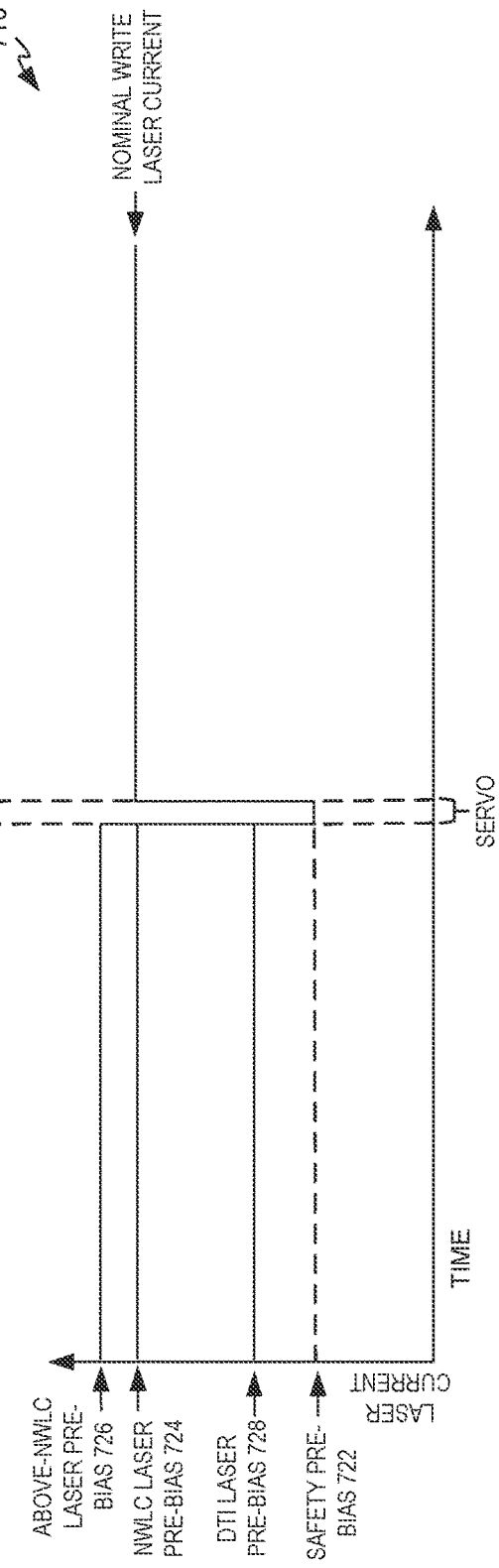

FIGS. 7A and 7B show conceptual graphs 700, 710, respectively, showing examples of both data erosion avoidance mode and data erosion alleviation mode together, in accordance with aspects of this disclosure. FIGS. 7A and 7B show additional views of corresponding fly height trajectories and laser pre-bias current values, respectively, over time, across a preceding sector 711 that precedes a write operation and then a selected first sector 712 of a write operation, for a disk drive of this disclosure operating in two examples of data erosion avoidance mode and one example of data erosion alleviation mode, in various examples of this disclosure, as well as of a conventional disk drive operating with a conventional laser pre-bias current with a safety margin to prevent any non-negligible thermal data erosion, for comparison. Graph 700 shows fly height over time in an inverse orientation, such that higher along the y-axis indicates closer to the disk surface.

As FIGS. 7A and 7B show, in one example, laser pre-bias management circuitry 30 may operate a head in a data erosion avoidance mode with an above-nominal write laser current (above-NWLC) laser pre-bias current 726 during flight of the head proximate to preceding sector 711, such that the head follows fly height trajectory 736 and goes from nominal cruise fly height to slightly closer than nominal fly height during flight of the head proximate to preceding sector 711, just enough to settle down during servo passage flight to the ideal nominal write fly height during flight over the selected first sector 712 of the write operation. In another example also in a data erosion avoidance mode, laser pre-bias management circuitry 30 may operate a head with a nominal write laser current (NWLC) laser pre-bias current 724 during flight of the head proximate to preceding sector 711, such that the head follows fly height trajectory 734 and goes from nominal cruise fly height to close to nominal fly height during flight of the head proximate to preceding sector 711, and then further asymptotically approaches nominal write fly height during flight over the selected first sector 712 of the write operation.

In another example, laser pre-bias management circuitry 30 may operate a head in a data erosion alleviation mode with a DTI laser pre-bias current 728 during flight of the head proximate to preceding sector 711, such that the head follows fly height trajectory 738 and goes from nominal cruise fly height to partially approach nominal fly height during flight of the head proximate to preceding sector 711, and then further asymptotically approaches nominal write fly height during flight over the selected first sector 712 of the write operation. Laser pre-bias management circuitry 30 may be configured to optimize between promoting relatively powerful initial write strength in selected first sectors of write operations, such as sector 712, and constraining data erosion to preceding sectors that precede new writes and contain pre-existing data, such as sector 711. In some examples, laser pre-bias management circuitry 30 may be configured to calibrate this optimization for each head individually.

For comparison, FIGS. 7A and 7B show (in dashed lines) conventional safety margin pre-bias 722 and its corresponding fly height profile 732. In this case, the head remains at nominal cruise fly height until the start of a write operation, and then attempts to begin the write operation initially from the nominal cruise fly height while approaching the nominal write fly height, typically resulting in an unreliable initial write and lost data, or the need to wait for some time for the NPTP to rise before starting to write the user data, which would be a waste of disk capacity. As depicted in FIGS. 7A and 7B show, examples of this disclosure resolve these issues, among other inventive advantages.

Laser pre-bias management circuitry 30 may be implemented differently in different examples based on the type of data recording technology used in the disk drive. For example, the disk drive may use either conventional magnetic recording (CMR) or shingle magnetic recording (SMR) in different examples. In both CMR and SMR disk drives, laser pre-bias management circuitry 30 may implement DTI avoidance equivalently by selecting physical sectors or blocks of multiple sectors to write that have no data in the preceding sector, and preferentially that have pre-existing data in the immediately subsequent one or more sectors. In SMR disk drives in various examples, laser pre-bias management circuitry 30 may defer to SMR protocols for writing sectors in SMR logical zones, which may reduce the scope of laser pre-bias management circuitry 30 implementing DTI avoidance, and accelerate the transition for laser pre-bias management circuitry 30 to transition from implementing DTI avoidance to implementing DTI alleviation, in some examples. Laser pre-bias management circuitry 30 may also implement DTI-compensating data refresh operations, after tracking that any one or more sectors have entered a threshold number of DTI alleviation operations or have otherwise experienced a set level of DTI, differentially in CMR and SMR disk drives.

In CMR disk drives, laser pre-bias management circuitry 30 may perform DTI-compensating data refresh operations by re-writing sequentially ordered sectors in place. In SMR disk drives, laser pre-bias management circuitry 30 may perform DTI-compensating data refresh operations by re-writing sectors in conformance with SMR zone writing protocols, which may involve re-writing zones with logical sectors interleaved among physical sectors. In these cases, laser pre-bias management circuitry 30 may rewrite the DTI-impacted sectors in one or more new sectors in one or more logical zones. In these cases, the DTI-impacted data may be physically fragmented, and rewriting the DTI-impacted sectors may involve de-fragmenting the data in the sectors being rewritten. In CMR drives, if some data is deleted over time, such that the remaining data becomes relatively scattered or fragmented among sectors without data and/or with deleted data such that they're available for writing, and consistent with the level of leeway the disk drive may have to perform background operations, laser pre-bias management circuitry 30 may perform operations to rewrite remaining existing data into more compact arrangements of sectors, thereby de-fragmenting or condensing the remaining data, and opening up a greater number of contiguous available sectors, and thereby broadening the scope for future performing write operations in DTI avoidance mode rather than in DTI alleviation mode.

As part of the DTI alleviation, laser pre-bias management circuitry 30 may comprise firmware that keeps track of DTI boosted laser pre-bias proximate to each sector with pre-existing data, and aims to select blocks of sectors to write to that are preceded by sectors that have had among the lowest number of prior DTI encounters, thereby leveling DTI wear or erosion across written data sectors, within the constraints of the locations and arrangements of pre-existing data sectors and sectors to be written to. The firmware comprised in laser pre-bias management circuitry 30 may further respond to a sector reaching a selected DTI threshold by marking the sector for a DTI refresh write, and then performing the DTI refresh write at an opportune time, which may be as a background process when the disk drive has some idle time, for example. The firmware comprised in laser pre-bias management circuitry 30 may also comprise algorithmic instructions such that if the primary conditions (e.g., available idle time) for performing DTI refresh writes do not occur through one or more additional DTI passes over one or more sectors marked for DTI refresh writes, laser pre-bias management circuitry 30 may escalate the priority for performing the DTI refresh writes, such that control circuitry 22 may fit in the DTI refresh writes of the affected one or more sectors before they become too much eroded by DTI effects, while laser pre-bias management circuitry 30 continues to be able to write new data and to use boosted laser pre-bias in conjunction with DTI alleviation operations in writing new data, in various examples. Thus, in accordance with various examples, laser pre-bias management circuitry 30 may manage usage of boosted laser pre-bias to ensure preservation of existing data.

Laser pre-bias management circuitry 30 may also implement boosted laser pre-bias across two or more sectors prior to a write operation, in some examples. Laser pre-bias management circuitry 30 may also implement boosted laser pre-bias across only a fraction of the one sector immediately preceding the one or more sectors to write to, or the entire sector immediately preceding the one or more sectors to write to plus a fraction of the sector prior to that, or in other fractional amounts of sectors, in various examples. Laser pre-bias management circuitry 30 may thus be configured to output the boosted laser pre-bias current to the laser diode of the head across only a fraction of a sector, more than one sector, and any fractional amount of sectors above one sector, prior to a write operation to the selected sector, in any of various examples.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprise logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all or any of method 80 and other methods of this disclosure may be performed by or embodied in hardware, and/or performed or executed by a controller, a CPU, an FPGA, an SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   one or more disks;
   an actuator mechanism configured to position a head among one or more heads proximate to a corresponding disk surface among the one or more disks; and
   one or more processing devices configured to:
      select a sector on the corresponding disk surface to which to write data, wherein the sector is selected in accordance with a data erosion mitigation pattern; and
      output, while the head is positioned proximate to a preceding sector that precedes the selected sector, a laser pre-bias current to a laser-generating component of the head, wherein the laser pre-bias current is sufficient to induce data erosion on the preceding sector.

2. The data storage device of claim 1, wherein selecting the sector to which to write data comprises selecting a sector subsequent to a sector that does not comprise pre-existing data.

3. The data storage device of claim 1, wherein the laser pre-bias current is higher than a nominal write laser current.

4. The data storage device of claim 1, wherein the laser pre-bias current is substantially equivalent to a nominal write laser current.

5. The data storage device of claim 1, wherein the laser pre-bias current is at least half of a nominal write laser current.

6. The data storage device of claim 1, wherein the laser pre-bias current is at or above a laser threshold of the laser-generating component.

7. The data storage device of claim 1, wherein if there is no available sector subsequent to a sector that does not comprise pre-existing data, the one or more processing devices are further configured to:
output, at a time when the head is positioned proximate to a preceding sector that precedes the selected sector, the laser pre-bias current to the laser-generating component of the head, such that the laser pre-bias current is not sufficient to induce enough data erosion on the preceding sector to erase data written on the preceding sector in a single pass proximate to the preceding sector; and
increment, in an index, a tracking measure referenced to the preceding sector.

8. The data storage device of claim 7, wherein selecting the sector to which to write data comprises selecting an available sector for which a preceding sector has a tracking measure referenced to it in the index that is less than at least one other tracking measure in the index.

9. The data storage device of claim 7, wherein the one or more processing devices are further configured to, in response to the tracking measure reaching a selected threshold value, perform a refresh write of the preceding sector.

10. The data storage device of claim 1, wherein the one or more processing devices are further configured to, in response to detecting a plurality of data sectors that are fragmented among sectors without data or with deleted data, rewrite the fragmented data sectors into one or more compacted sets of contiguous sectors.

11. The data storage device of claim 1, wherein the one or more processing devices are further configured to maintain the laser pre-bias current while a near-field transducer (NFT) of the head is passing proximate to a write-to-read recovery (WRR) area preceding a servo wedge.

12. The data storage device of claim 1, wherein the laser pre-bias current is a preceding sector-proximate laser pre-bias current for applying during the preceding sector, wherein the one or more processing devices are further configured to:
apply a servo-proximate laser pre-bias current, at a value lower than the preceding sector-proximate laser pre-bias current, while a near-field transducer (NFT) of the head is passing proximate to a servo wedge; and
apply a write-to-read recovery (WRR) area-proximate laser pre-bias current while the NFT is passing proximate to a WRR area preceding the servo wedge, wherein the WRR area-proximate laser pre-bias current is independent of both the preceding sector-proximate laser pre-bias current, and the servo-proximate laser pre-bias current.

13. The data storage device of claim 1, wherein the one or more processing devices are further configured to output the laser pre-bias current to the laser-generating component of the head across more than one sector prior to a write operation to the selected sector.

14. The data storage device of claim 1, wherein the one or more processing devices are further configured to calibrate one or more parameters for the laser pre-bias current for the head, wherein calibrating comprises:
performing a test write operation to a test sector at two or more candidate values of the laser pre-bias current; and
detecting a level of data erosion on a preceding sector preceding the test sector at each of the two or more candidate values of the laser pre-bias current.

15. A method comprising:
selecting, by one or more processing devices, a sector on a corresponding disk surface of a data storage device to which to write data, wherein the sector is selected in accordance with a data erosion mitigation pattern; and
outputting, by the one or more processing devices, while the head is positioned proximate to a preceding sector that precedes the selected sector, a laser pre-bias current to a laser-generating component of the head, wherein the laser pre-bias current is sufficient to induce significant data erosion on the preceding sector.

16. The method of claim 15, wherein selecting the sector to which to write data comprises selecting one or more sectors that are subsequent to a sector that does not comprise pre-existing data, and that are immediately preceding a sector that comprises pre-existing data, and
wherein the laser pre-bias current is higher than or substantially equivalent to a nominal write laser current.

17. The method of claim 15, wherein if there is no available sector subsequent to a sector that does not comprise pre-existing data, the method further comprises:
outputting, at a time when the head is positioned proximate to a preceding sector that precedes the selected sector, the laser pre-bias current to the laser generating component of the head, such that the boosted laser pre-bias current is not sufficient to induce enough data erosion on the preceding sector to erase data written on the preceding sector; and
incrementing, in an index, a tracking measure referenced to the preceding sector,
wherein selecting the sector to which to write data comprises selecting an available sector for which a preceding sector has a tracking measure referenced to it in the index that is less than at least one other tracking measure in the index.

18. One or more processing devices comprising:
means for outputting, at a time when a head of a data storage device is positioned proximate to a preceding sector that precedes a selected sector to which to write data on a corresponding disk surface, a laser pre-bias current to a laser-generating component of the head, such that the laser pre-bias current is sufficient to induce data erosion on the preceding sector, but not enough data erosion on the preceding sector to erase data written on the preceding sector in a single pass of the head proximate to the preceding sector; and
means for incrementing, in an index, a tracking measure referenced to the preceding sector.

19. The one or more processing devices of claim 18, further comprising:
means for determining whether there is an available contiguous set of one or more sectors of a size for a new write operation that is subsequent to a sector that does not comprise pre-existing data,
wherein the means for outputting, at a time when the head is positioned proximate to a preceding sector that precedes a selected sector to which to write data, a laser pre-bias current to the laser-generating component of the head, such that the laser pre-bias current is sufficient to induce data erosion on the preceding sector, but not enough data erosion on the preceding sector to erase data written on the preceding sector in a single pass of the head proximate to the preceding sector, and the means for incrementing, in the index, a tracking measure referenced to the preceding sector, are used in response to determining that there is not an available contiguous set of one or more sectors of a size for the new write operation that is subsequent to a sector that does not comprise pre-existing data.

20. The one or more processing devices of claim 19, further comprising:

means for outputting, at the time when the head is positioned proximate to the preceding sector that precedes the selected sector to which to write data, in response to determining that there is an available contiguous set of one or more sectors of a size for the new write operation that is subsequent to a sector that does not comprise pre-existing data, a laser pre-bias current to the laser-generating component of the head, such that the laser pre-bias current is at least half of a nominal write laser current.

* * * * *